(12) United States Patent
Miyoshi

(10) Patent No.: US 6,412,888 B1
(45) Date of Patent: Jul. 2, 2002

(54) RUBBER PAD AND LOCK PIN FOR IRON CRAWLER BELT

(75) Inventor: Yasuo Miyoshi, Tokyo (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/636,480

(22) Filed: Aug. 10, 2000

(30) Foreign Application Priority Data

Mar. 30, 2000 (JP) ........................ 2000-093899

(51) Int. Cl.⁷ .................. B62D 55/08; B62D 55/28; A01B 33/00; B60B 15/00

(52) U.S. Cl. .................. 305/188; 305/51; 305/187

(58) Field of Search .................. 305/46, 51, 187, 305/188, 189, 190, 191, 192

(56) References Cited

U.S. PATENT DOCUMENTS 5,388,900 A * 2/1995 Suzuki ..................... 305/187
5,769,511 A * 6/1998 Hattori .................... 305/51
6,213,573 B1 * 4/2001 Nakayama ................ 305/51

* cited by examiner

Primary Examiner—S. Joseph Morano
Assistant Examiner—Jason R. Bellinger
(74) Attorney, Agent, or Firm—Flynn, Thiel, Boutell & Tanis, P.C.

(57) ABSTRACT

Fitting and exchanging operations are easily performed without using bolts. In a rubber pad 2 to be equipped to an iron crawler belt 1, a vulcanized rubber material 6 is adhered to a second surface of a flat metal core 5 having a first hook 7 and second hook 8 formed at opposite ends of the metal core 5. The length of the second hook 8 is longer than that of the first hook 7, and the length of concavity 9 formed on a first surface of the metal core 5 opposite the longer second hook 8 is no more than one fifth of the length of the metal core 5 in the cross direction of the iron crawler belt.

5 Claims, 9 Drawing Sheets

RUBBER PAD AND LOCK PIN FOR IRON CRAWLER BELT

BACKGROUND OF THE INVENTION

1. Field of the Invention

This invention relates to a rubber pad for an iron crawler belt and a lock pin, which is used therewith, of a caterpillar.

2. Description of the Related Art

In building and engineering machines and the like, which are required for running, an iron crawler belt as a running means has been used. In the iron crawler belt, rectangular iron plates called as "shoe plates" pivot with respect to each other so as to form a continuous belt by means of a link mechanism called a "track link" and the iron crawler belt is provided. The rubber pads are used with the iron crawler belt for the purpose of hindering from sliding, preventing noise and so on, the rubber pads comprising a single synthetic rubber such as natural rubber, styrene-butadiene rubber, nitrile rubber and the like or a mixture thereof. By the provision of rubber pads having a single or multiple layers of a rubber in the direction of thickness, the impact due to the machine weight is absorbed by the elastic deformation of the rubber and the weight is extremely and uniformly dispersed in running on a paved road surface so that it is intended to prevent the damage of the road surface.

The following caterpillars in the prior art have been developed:

(1) Holes for fitting a rubber pad is formed previously on a shoe plate, and the rubber pad, which rubber is vulcanized and adhered to a metal core, as well as the shoe plate, is tied by means of nuts to the rubber pad with the metal core, to which bolts are welded. (Utility Model Publication No. 63 (1988)-12066; "Rubber Pad for Iron Crawler")

(2) Metal members of a rubber pad, in which rubber is vulcanized and adhered to the members, and a shoe plate is clipped at its ends. (Utility Model Laid-Open No. 63 (1988)-202584; "Structure for Fitting Rubber Pad in Crawler Running Apparatus")

(3) An engaging member, which is united with or separated from the metal core of a rubber pad, a rubber is vulcanized and adhered to the metal core, and a shoe plate is tied with the rubber pad by means of bolts at its ends. (Utility Model Laid-Open No. 56 (1981)-136868; "Pad for Caterpillar")

(4) A semicircular groove is formed on opposed surface between a grouser of a shoe plate and a rubber pad and a pair of long pins are inserted into the groove to fit them (Utility Model Laid-Open No. 2 (1965)-42884; "Rubber Pad for Caterpillar Car").

In the prior art (1) and (3), however, skill is required to tie a bolt and a nut in a narrow portion of a caterpillar, and it takes a long time to fit and exchange them and the operation is troublesome. In the prior art (2), the shoe plate and the metal member of the rubber pad are fixed by means of clips, so that the clips are apt to fall out through a vibration in running of an engineering mechanism etc. In the prior art (4), a skill for inserting a pair of long pins is required and the pins are apt to fall out because the pins are merely put into rubber against an elastic pressure.

In the prior art as mentioned above, a rubber pad is fixed to a shoe plate by means of a bolt, so that skill is required for tying the bolt. The operation is troublesome, a long time is required for fitting and exchanging them and the work must be performed by an expert, such as a maker or a dealer, disadvantageously. Thus, it is necessary to provide such an iron crawler belt and a rubber pad that may be easily fixed and exchanged and everyone may fit and exchange them on the spot.

SUMMARY OF THE INVENTION

In view of the above-mentioned actual circumstances, an object of this invention is to provide a rubber pad for an iron crawler belt and a lock pin, which is used therewith, through which the operation of fitting and exchanging may be performed easily without a bolt.

The invention is a rubber pad to be equipped to an iron crawler belt characterized in that a vulcanized rubber is adhered to a second surface of a flat metal core, first and second bent hooks are respectively provided at both ends of first surface of said metal core, the length of the second hook being greater than that of the first one, and the length of a concavity formed on the first surface of the metal core opposed to the second hook is equal to one fifth of the length of the metal core or less in the direction perpendicular to the traveling direction of the iron crawler belt (in the cross direction of the iron crawler belt). The invention is also characterized in that the ends of a shoe plate of an iron crawler belt can be engaged with and removed from the hooks united with the metal core in the inclined state so that the rubber pad may be simply equipped to the shoe plate without a deformation of the metal core.

The invention also is a rubber pad for an iron crawler belt characterized in that through holes are formed in the metal core and the rubber material protrudes through said through holes to the first surface of the metal core. The invention is also characterized in that the rubber material stands between the metal core and the shoe plate so that metals may not directly contact each other, preventing the abrasion of the metal core and the shoe plate as well as the occurrence of noise.

The invention also is characterized in that another group of through holes are formed approximately at the center of the rubber material, thereby, the mud entering in between the metal core and the shoe plate may be easily discharged outward.

The invention also is directed to a lock pin for fixing the rubber pad for an iron crawler belt to a shoe plate. The invention is characterized in that metal plates are provided on both sides of the lock pin, engaging members in the form of projections are formed at both ends of the metal plates by extending a portion of the metal plates straight in the same direction, an elastic material is adhered between the metal plates on both sides, and the lock pin is formed so as to adapt to the space that is defined with the second hook, the metal core, and the end of the shoe plate. Even when the lengths of the shoe plates have a deviation, an error in the lengths of the shoe plates is counterbalanced due to the flexibility of the elastic material used in the lock pin, which is inserted in the space between the end of the shoe plate and the concavity formed on the metal core, thereby the rubber pad for the iron plate can be fixed closely to the shoe plate.

The invention also is a lock pin for fixing the rubber pad for an iron crawler belt characterized in that at least one surface of each metal plate is inclined so that the lock pin can be easily inserted in the space between the end of a shoe plate and the concavity on the metal core.

The invention also is a lock pin for fixing the rubber pad for an iron crawler belt characterized in that a part of the elastic material projects from the surface, on which the engaging projections of both side metal plates are formed, and the opposed surface thereto. Thereby, the elastic material in the lock pin is pressed on both the shoe plate and the metal core to prevent the falling-out of the lock pin.

The embodiments according to this invention will be illustrated with reference to the drawings hereinafter.

DESCRIPTION OF THE PREFERRED EMBODIMENTS

Figure 5:
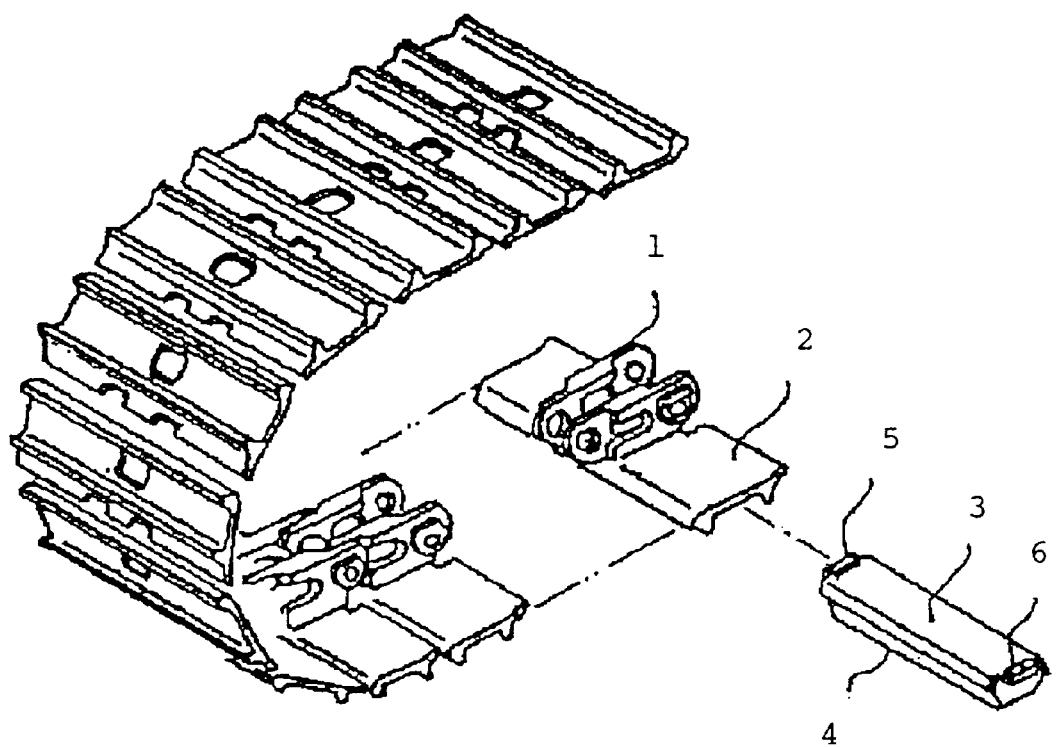
FIG. 5 is a perspective view of the shoe plate and the rubber pad.

FIG. 5 is a perspective view showing an iron crawler belt 1 and a rubber pad 2, in which a plurality of shoe plates 3 comprising a rectangular metal plate pivot with respect to each other by a track link 4 so as to form the shoe plates as a continuous belt. The rubber pad 2 according to this invention, which is equipped to the iron crawler belt 1, is adhered by a vulcanized rubber material 6 on a second surface of a flat metal core 5 (the lower surface in FIG. 5) and a first hook 7 and a second hook 8 are formed at each end on a second surface of the metal core (the upper surface in FIG. 5) as illustrated in detail hereinafter.

Figure 1:
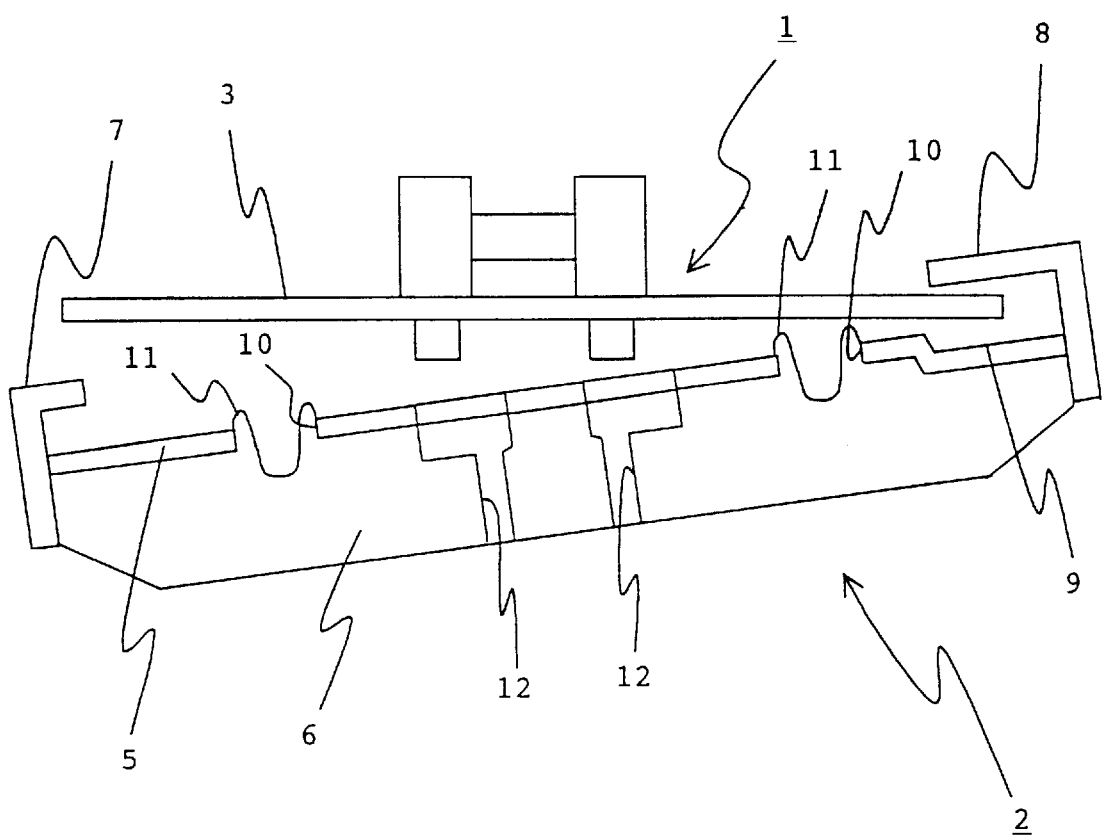
FIG. 1 is a cross-sectional view in the direction perpendicular to the traveling direction of the iron crawler belt (in the cross direction of the iron crawler belt), showing the fitting of an example of the rubber pad according to this invention to a shoe plate.

FIG. 1 is a cross-sectional view in the direction perpendicular to the traveling direction of the iron crawler belt (in the cross direction of the iron crawler belt), showing the fitting of an example of the rubber pad 2 according to this invention to one shoe plate 3 of the iron crawler belt 1. The first hook 7 and the second hook 8 are formed at both ends on the first surface of the metal core 5, the length of the horizontally-bent portion of the second hook 8 is larger than that of the first hook 7 and the distance between the inner surface of the horizontally-bent portion of each hook 7, 8 and the first surface of metal core 5 is equal to the thickness of shoe plate 3 constituting the iron crawler belt 1. A concavity 9 is formed on the first surface of the metal core 5 opposed to the inner surface of the horizontally-bent portion of the second hook 8. The length of concavity 9 in FIG. 1, in the horizontal direction on this cross-sectional plane, is equal to one fifth of that of the metal core 5 or less.

A plurality of through holes 10 are formed at plural spots of the metal core 5, a portion of the rubber material 6 protrudes through the through holes 10 to the first surface of the metal core to form a rubber projection 11. Further, a plurality of through holes 12 are formed approximately at the center of the rubber material 6.

Figure 6:
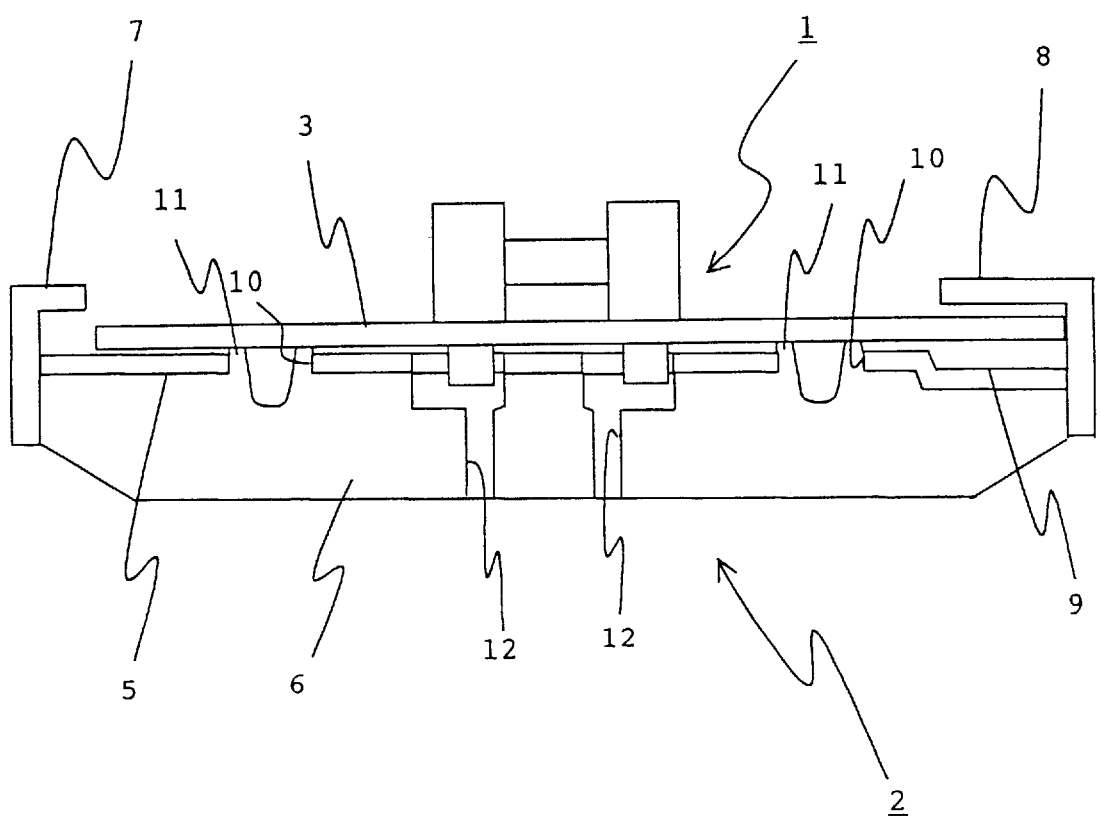
FIG. 6 is a longitudinal cross-sectional view showing a fitting step of the rubber pad according to this invention.
Figure 9:
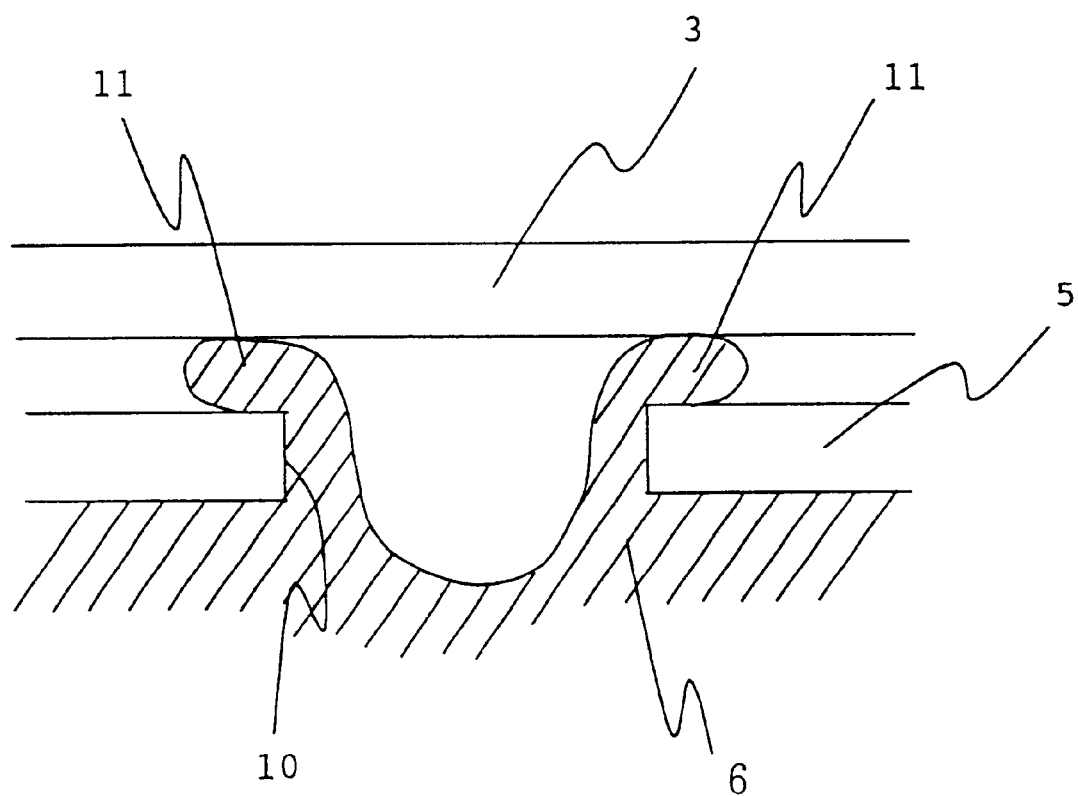
FIG. 9 is a partial magnified view around a through hole formed in the rubber pad equipped to the shoe plate.

When the rubber pad 2 as mentioned above is equipped to the iron crawler belt 1, first, the second hook 8 is engaged with one end of the shoe plate 3 while slightly inclining the metal core 5 of the rubber pad 2 relative to the shoe plate 3 of the iron crawler belt 1 as shown in FIG. 1. Next, the other end of the shoe plate 3 is impacted by hitting a hammer or the like to move the one end of the shoe plate 3 against the innermost of the concavity 9 as shown in FIG. 6. Thereby, the other end of the shoe plate 3 advances closer to the center than the hook 7. Accordingly, the metal core 5 becomes parallel to the shoe plate 3 so that the rubber projection 11 may be held between the metal plate 5 and the shoe plate 3 as shown in FIG. 9.

Figure 7:
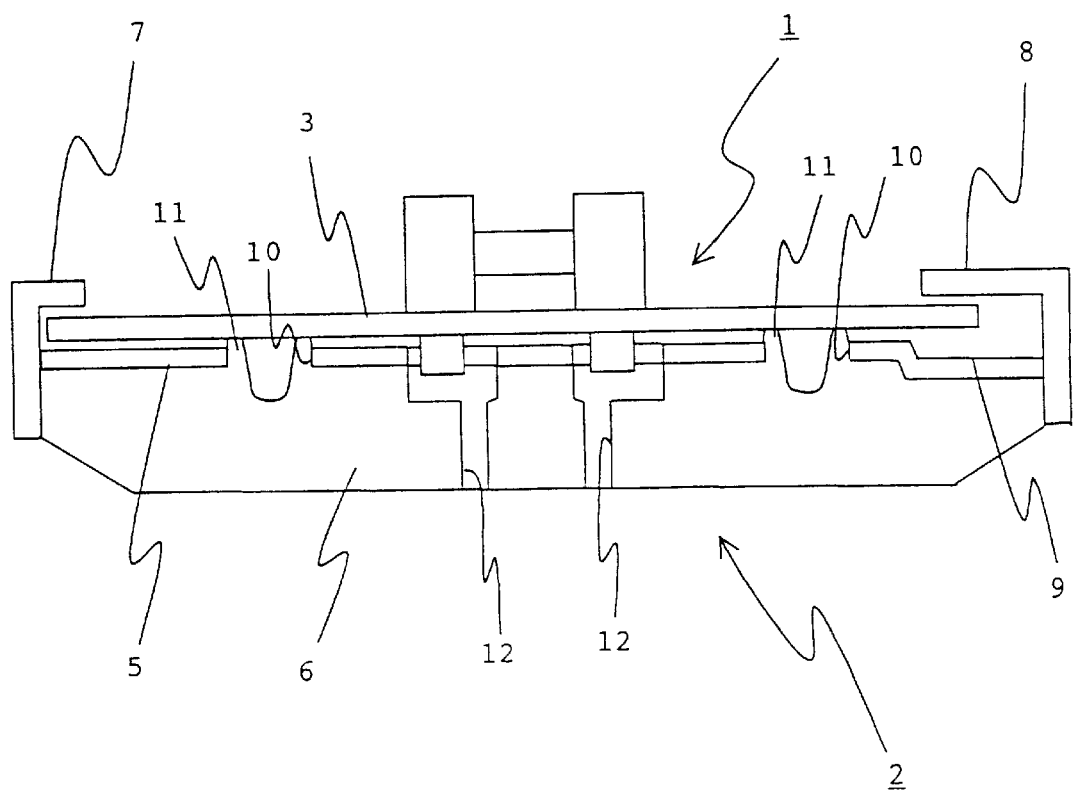
FIG. 7 is a longitudinal cross-sectional view showing another fitting step of the rubber pad according to this invention.
Figure 8:
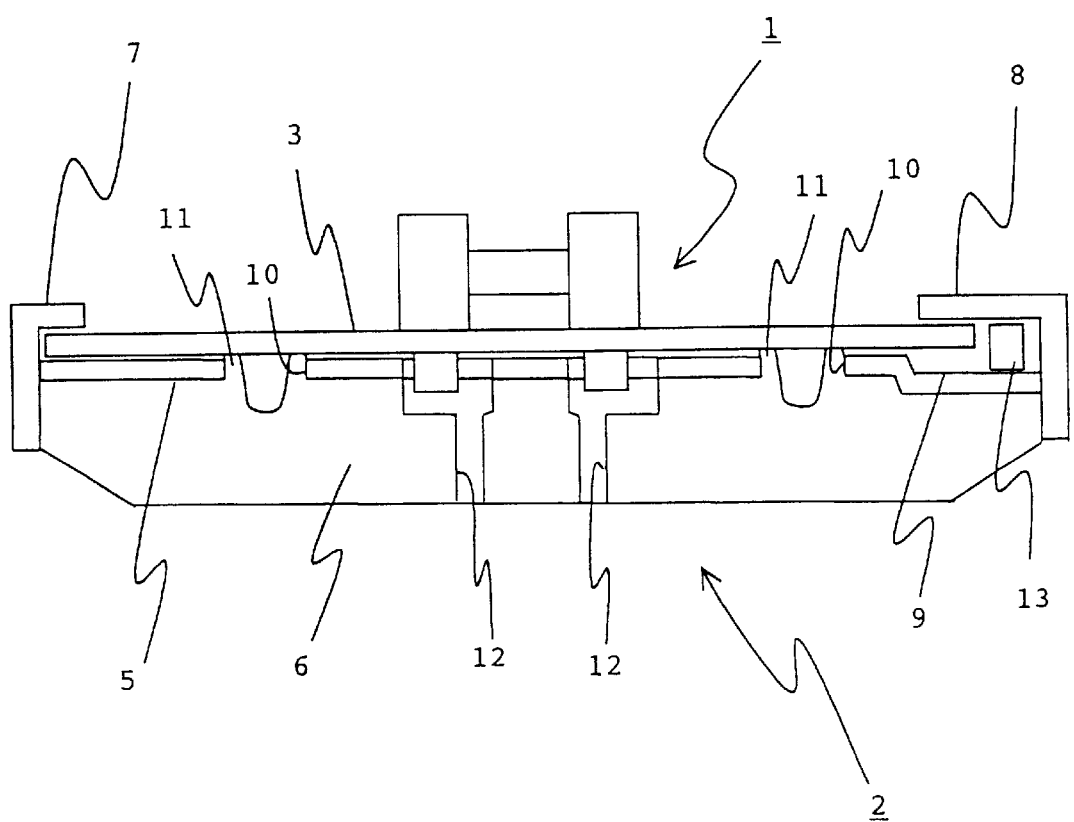
FIG. 8 is a longitudinal cross-sectional view showing still another fitting step of the rubber pad according to this invention.

When the rubber pad 2 as shown in FIG. 6 is impacted from the side of the first hook 7 by hitting a hammer or the like, the other end of the shoe plate 3 moves against the innermost portion of the first hook 7 as shown in FIG. 7. The rubber pad 2 is fitted to the shoe plate 3 of the iron crawler belt 1 by means of the first and the second hooks 7, 8 at both ends of the metal core 5. In the state of FIG. 7, a lock pin 13 is hit into the concavity 9 at the inside of the longer second hook 8 as shown in FIG. 8, thereby, the rubber pad 2 is fixed to the shoe plate 3 and cannot be removed from the iron crawler belt 1.

The length of the concavity 9 in FIG. 1, in the horizontal direction on this cross-sectional plane, in other words, in the direction perpendicular to the traveling direction of the iron crawler belt (in the cross direction of the iron crawler belt), is equal to one fifth of that of the metal core 5 or less. If the length of the concavity 9 is more than one fifth of that of the metal core 5, the strength of the metal core 5 as a reinforcing material is lowered resulting in the occurrence of problems such as a deformation.

Figure 2:
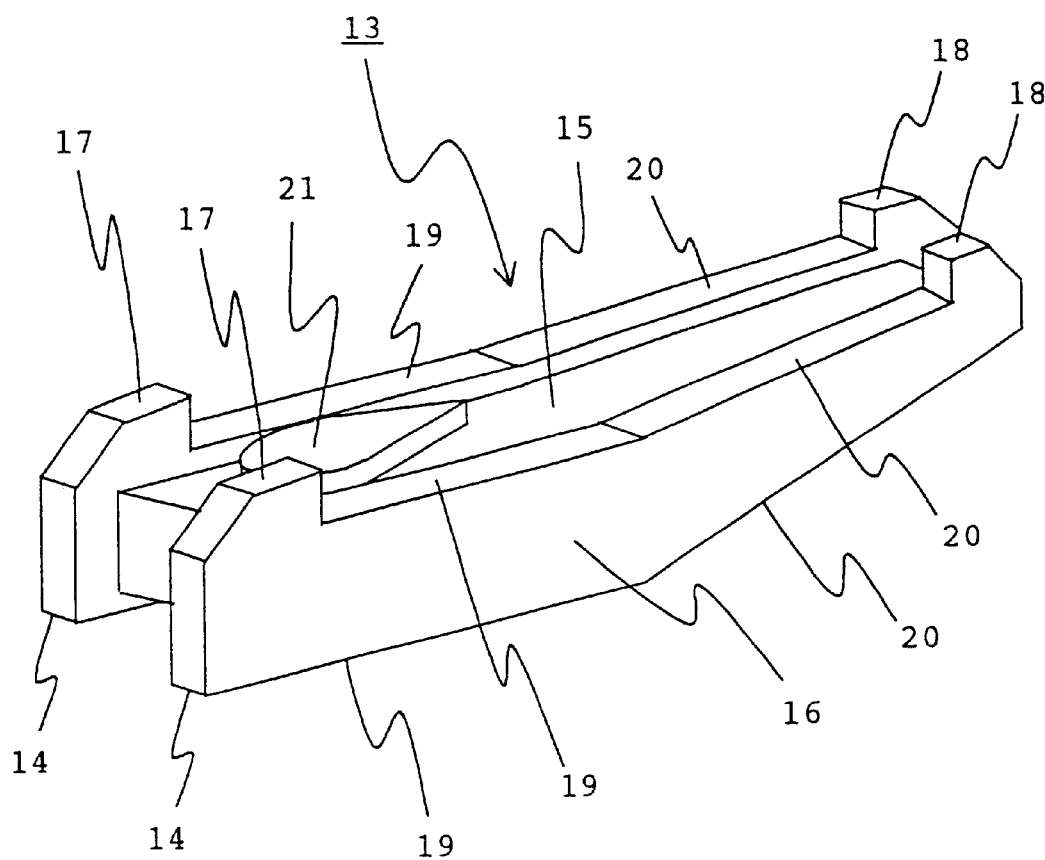
FIG. 2 is a perspective view of an example of the lock pin according to this invention viewed from above.
Figure 3:
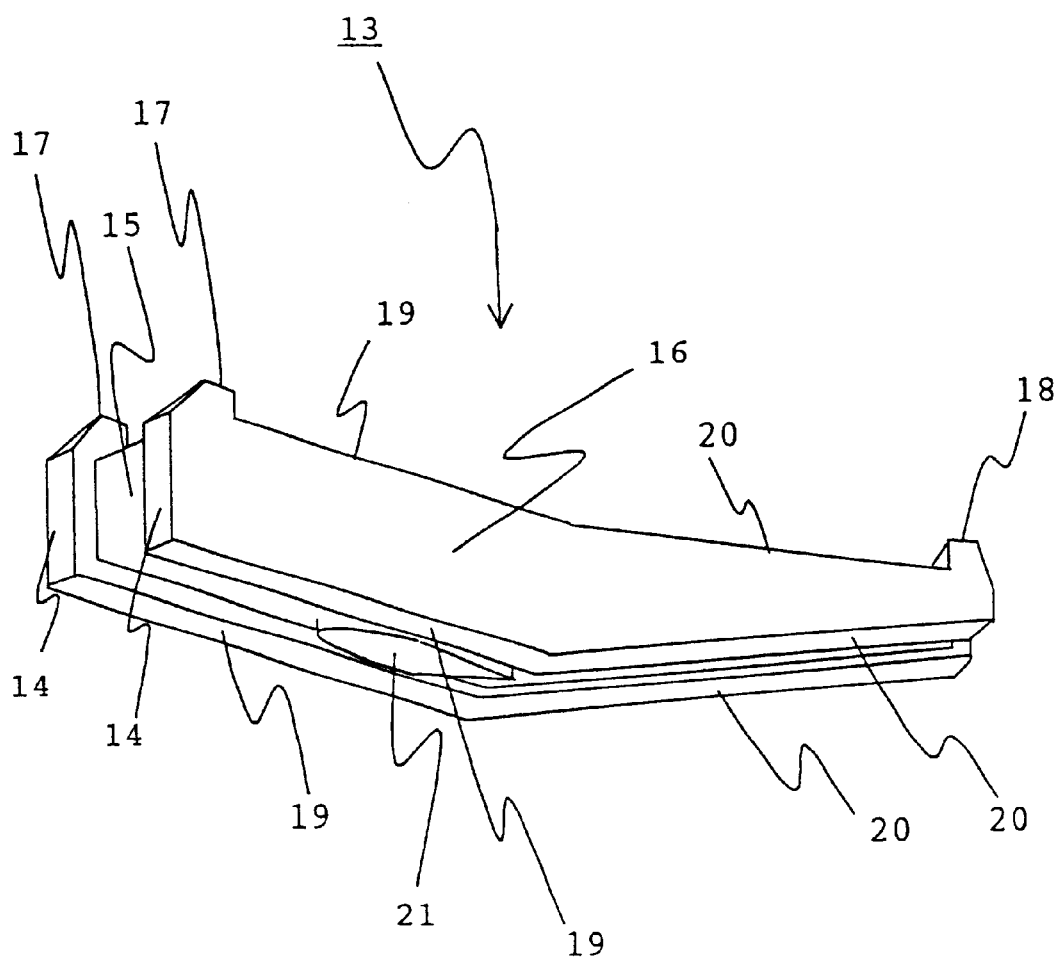
FIG. 3 is a perspective view of the lock pin in FIG. 2 viewed from below.
Figure 4:
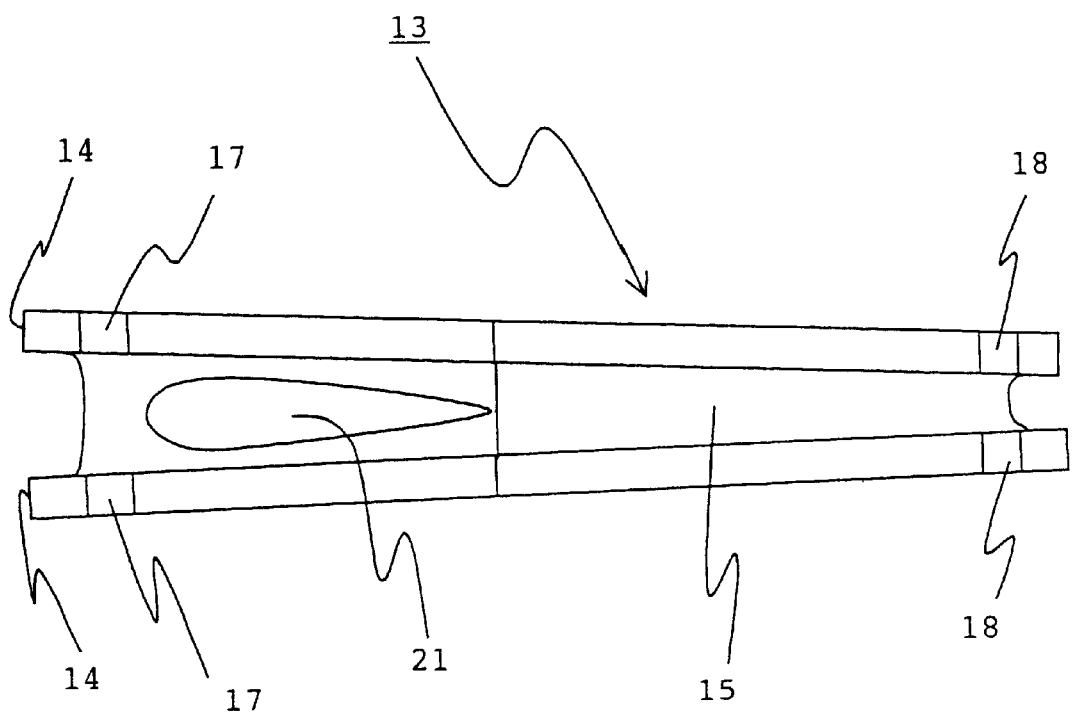
FIG. 4 is a plane view of FIG. 2.

FIG. 2 is a perspective view of an example of the lock pin 13 as mentioned above and viewed from above, FIG. 3 is a perspective view of the lock pin 13 viewed from below and FIG. 4 is a plane view of FIG. 2. As shown in FIG. 4, the lock pin is formed so as to conform to the space defined by the second hook 8, first surface of the metal core 5 and an end of the shoe plate 3. As shown in FIGS. 2–4, the metal plates 14, 14, such as stainless steel plates, are provided at both sides of the lock pin 13 and the elastic material 15, such as rubber, is adhered between the metal plates 14, 14 by means of vulcanization-adhesion or the like.

As shown in FIGS. 2–4, the engaging projections 17, 18 project straightly at both ends of each metal plate 14, in other words, a portion of the surface 16 of the metal plate 14 straightly extends upward at each end of the metal plate 14. On viewing the metal plate 14 from the side surface, the upper and the lower surface 19, 19 are parallel to each other in the vicinity of the engaging projections 17, 17. Then, the upper and the lower surfaces continued from the surfaces 19, 19 ascend from an intermediate position to the engaging projections 18, 18 so as to form inclined surfaces 20, 20 and approach each other. As a result, the longitudinal size of the engaging projection 18 is smaller than that of the engaging projection 17. On seeing the lock pin 13 from above, the metal plates 14, 14 at both sides are inclined as shown in FIG. 4 so as to approach each other at the side of the engaging projection 18. The distance between the two plates 14, 14 of the lock pin 13 at the engaging projection 18 is smaller than that at the side of the engaging projection 17. The elastic material 15 adhered in between the metal plates 14, 14 protrudes partially from the upper and lower surface of the metal plates to form a projection 21.

When the lock pin 13 as mentioned above is driven into the interior of the second hook 8 as shown in FIG. 8, the lock pin 13 is easily inserted into the second hook 8 with the end of the engaging projection 18, where the longitudinal size as well as the horizontal width of the engaging projection 18 are smaller. Even if the sizes of the space between the end of the shoe plate 3 and the inside of the second hook 8 have a deviation, the elastic material 15 adhered between the metal plates 14, 14 is bent to fix with certainty the shoe plate 3 of the iron crawler belt 1 to the rubber pad 2. The projection 21 of the elastic material 15 is contacted tightly to the second hook 8 and the metal core 5 to prevent the removal of the lock pin 13.

When the rubber pad 2 is fixed to the shoe plate 3 of the iron crawler belt 1, the abrasion of the metal core 5 and the shoe plate 3 as well as noise can be prevented without the direct contact of metals with each other because the rubber projection 11 lies in between the metal core 5 and the shoe plate 3 as shown in FIG. 9. Since the through holes 12 are formed approximately at the center of the rubber material 6, the mud entering in between the metal core 5 and the shoe plate 3 is apt to be discharged easily outward.

When the rubber pad 2 is removed from the shoe plate 3 of the iron crawler belt 1, the lock pin 13 is first drawn out from the inside of the second hook 8 as shown in FIG. 7 and the steps as shown in FIG. 6 and 1 can be performed.

What is claimed is:

1. A rubber pad-lock pin combination for an iron crawler belt comprising:
    a flat metal core having a concavity formed on one end of a first surface thereof, the length of the concavity being no more than one fifth of the length of the metal core in a direction perpendicular to a traveling direction of the iron crawler belt, and a plurality of through holes formed therein;
    a vulcanized rubber material adhered to a second surface of the metal core and protruding through said through holes to the first surface of the metal core;
    a first hook provided at an end of the first surface of said metal core;
    a second hook provided at an opposite end of the first surface of said metal core, a horizontally-bent portion of the second hook being longer than that of the first hook; and
    a lock pin for fastening the rubber pad to the iron crawler belt disposed in said cavity.

2. The rubber pad-lock pin combination according to claim 1, wherein a plurality of through holes are formed approximately at the center of the rubber material.

3. The rubber pad-lock pin combination according to claim 1, wherein the lock pin comprises:
    a plurality of metal plates, said metal plates having engaging projections formed at opposite ends thereof by extending the metal plates straightly in one direction; and
    an elastic material adhered between the metal plates so as to adapt the shape of the lock pin to a space defined by the second hook and the metal core.

4. The rubber pad-lock pin combination according to claim 3, wherein the distance between the metal plates decreases from a first end of said metal plates to an opposite end of said metal plates.

5. The rubber pad-lock pin combination according to claim 4, wherein a part of the elastic material extends beyond an upper surface and a lower surface of the metal plates and the metal plates form side faces of the lock pin.

* * * * *